Reissued Mar. 27, 1934

Re. 19,123

UNITED STATES PATENT OFFICE 19,123

CREAM PROCESS AND ARTICLE

Herman D. Wendt, West Chester, Pa., assignor to Milk Processes, Incorporated, Philadelphia, Pa., a corporation of Pennsylvania No Drawing. Original No. 1,791,068, dated February 3, 1931, Serial No. 425,903, February 4, 1930. Application for reissue November 14, 1933, Serial No. 697,957

5 Claims. (Cl. 99—11)

The present invention relates to certain improvements in a process of preparing and preserving cream and other milk fat containing products and to a cream product produced in accordance with the process.

It is a well known fact that milk from cows usually includes in its composition from 3% to 5% of milk fat and that this milk fat is in the form of minute globules scattered throughout the milk. When milk is allowed to stand these globules rise to the surface by reason of the fact that they have a lower specific gravity than the remainder of the milk and they carry with them in rising a certain proportion of the milk. The cream which can be skimmed off after such standing comprises the original globules of milk fat separated by films of the remaining ingredients of the milk. This fat, therefore, is in the dispersed phase, i. e., the fat globules are not in contact with one another, but are in substantially their original emulsion and are held separated from one another by the remaining portions of the milk.

By the use of a centrifugal machine to effect the separation of the milk fat, this removal of the cream from the milk may be accomplished more quickly, and by properly designed machines, the proportion of milk fat to skimmed milk in the cream product obtained may be varied within certain limits as desired. Thus, it is possible to produce cream of 30% milk fat or even "double creams" running as high as 50% or 60% of milk fat.

In the practice of the process of the invention, it is proposed to produce a new product which has all of the characteristics of a cream and will hereinafter be denominated a "cream", since it comprises milk fat particles in the dispersed phase and held apart by a liquid vehicle. It differs, however, from standard creams by reason of the fact that the percentage of milk fat is higher than normal, and in the fact that it is a coherent plastic product at temperatures below the melting point of milk fat. This super-cream of the present invention may, therefore, be regarded as a plastic product with the milk fat in its original emulsified condition as the dispersed phase and with the solids other than fat in approximately their natural proportions.

The product thus produced has numerous advantages and an important feature of my invention consists in the utilization of these advantages in the transportation and preservation of creamery products and their ultimate manipulation to produce other creamery products of different type. The super-cream of my invention may be pasteurized or sterilized. When so treated it may be stored in containers and shipped to distant points in its concentrated form for ultimate manipulation by the addition of proper proportions of skimmed or whole fresh milk to produce a quick whipping cream or table cream, or it may merely be retained in storage at the place where it is produced until it is desired to dilute it to the strength at which it is ultimately to be used. The production of the super-cream of the invention and its ultimate dilution thus makes it possible to effect very considerable economies in storage and shipping space, and it also facilitates the transportation of creamery products by changing the milk fat content of the whole milk into a form in which it can be easily preserved and conveniently stored or shipped. It is to be particularly noted that the milk fat exists in the dispersed phase in this plastic super-cream product and that this milk fat thus exists in the normal condition of milk fat suspended in whole milk or cream.

In the production of the super-cream of the present invention a milk is preferably submitted to a centrifugal action of the usual type in order to remove the milk fat portion as a cream. As set forth above, this operation results in the production of a cream containing from 18% to 40% of milk fat. After the cream product has been obtained by centrifugal separation as above described, or in other suitable manner, it is heated to a temperature sufficient to render the milk fat therein contained fluid. The product is then immediately passed into a centrifugal machine operated at less capacity and substantially higher speed than used in ordinary cream separation.

This centrifugal treatment of the heated cream product in the second stage of centrifugal separation results in the further removal of solids of a non-fatty nature and the liquid vehicle to produce a product which is plastic when cooled below the melting point of the milk fat contained therein. This plastic product contains more than 65% of milk fat and the milk fat globules are in a state of dispersed suspension in the liquid vehicle.

The remaining portion of the vehicle in the plastic product remains as a film closely coating the milk fat particles and holding the particles of the milk fat in the dispersed phase. To this extent the final plastic product may be designated as a "super-cream". It will be understood, however, that the product is of much higher percentage in milk fat than creams heretofore produced by reason of the withdrawal of a large portion of the dispersing vehicle existing in the continuous phase of the emulsion.

The product has a consistency resembling butter and is adapted to be used as a spread on bread or for cooking. This product, however, differs from butter by reason of the fact that its continuous phase is the liquid vehicle and that the milk fat globules exist in dispersed phase in this vehicle, whereas the milk fat globules in butter constitute the continuous phase and the liquid contained is in dispersed form therein. By reason of the fact that this super-cream embodies an emulsion in which the phase relationship between the milk fat and the liquid vehicle is similar to that in ordinary milk and creams, the super-cream may be diluted by the addition of cream or whole milk to produce a cream or milk product having the characteristics of the milk or cream from which the super-cream is originally produced.

By the process of the present invention milk products may be very efficiently stored and readily transported and reconverted for use as a rich milk, table cream, whipping cream, for ice cream, and for general purposes. The cream of my invention may also be converted into butter by the simple application of pressure to the plastic mass. Again it may be converted into a cream suitable for churning and butter may be recovered from this cream by the well known method of churning.

The super-cream as it flows from the centrifugal separator may be directed at once into packages for distribution and cooled and changed to its plastic form in such packages. When it is desired to produce a pasteurized or sterilized product, the cream as it is received from the first centrifugal separator and when it is forewarmed or heated, is heated to a pasteurizing or sterilizing temperature and after this pasteurizing or sterilizing treatment it is cooled to the desired temperature for the final step of separation in which the butter fat is rendered fluid. The cream product may be pasteurized or sterilized prior to the heating step which precedes the final centrifuging, if desired. It is essential, however, that the pasteurization or sterlization of the cream product be performed prior to the subjection thereof to the final separation in which the super-cream is obtained. Any attempt to pasteurize the plastic super-cream product would result in an oiling of the milk fat and a changing of the phase of the super-cream into a condition in which it could not be kneaded to produce butter or directly reconverted into a table cream or whipping cream.

The process is preferably applied as a continuous process. The milk is passed continuously through the first centrifugal separator, then through suitable heating means, and then through the second centrifugal separator and into the containers for shipment or storage. It will be understood, of course, that the necessary cooling steps are applied in order to partially cool the product on the way to the container or that these cooling steps may be applied after the product has reached the container.

It will thus be seen that the invention contemplates the production of a super-cream constituting a novel and valuable article of commerce and that it also involves important improvements in the method of storing, shipping and manipulating milk products to produce the desired final creamery product, regardless of whether such product constitutes milk, cream or butter.

Having fully described my invention, what I claim as new and desire to secure by Letters Patent, is:

1. As an article of manufacture a plastic cream containing not less than sixty-five percent of milk fat held in the natural dispersed phase by the original and natural liquid emulsion and wherein the solids not fat and the original liquid vehicle are retained in approximately their natural proportions.

2. The process of producing a plastic cream which consists in forewarming or heating a cream to render the milk fat fluid while maintaining the integrity of the fat particles and the original emulsion holding the same in the dispersed phase, and subjecting said cream to a centrifugal separating force for removing sufficient of the liquid vehicle so as to produce when cooled a plastic mass of dispersed milk fat particles.

3. The process of producing and manipulating milk products which comprises heating a liquid milk product containing milk fat in dispersed phase to a temperature sufficiently high to render the milk fat fluid while maintaining the integrity of the fat particles and the original emulsion holding the same in the dispersed phase, subjecting said milk product to a centrifugal separating force for removing a sufficient quantity of the liquid vehicle to produce a milk product which, when cooled to ordinary temperatures, constitutes a plastic cream, cooling said milk product to produce a plastic cream and thereafter diluting said plastic cream to produce cream of the desired concentration.

4. The process of producing and manipulating milk products which comprises heating a liquid milk product containing milk fat in dispersed phase to a temperature sufficiently high to render the milk fat fluid while maintaining the integrity of the fat particles and the original emulsion holding the same in the dispersed phase, subjecting said milk product to a centrifugal separating force for removing a sufficient quantity of the liquid vehicle to produce a milk product which, when cooled to ordinary temperatures, constitutes a plastic cream, cooling said milk product to produce a plastic cream and thereafter treating said plastic cream to produce the ultimately desired milk product, said last-named treating step including the dilution of the plastic cream with liquid vehicle.

5. The process of producing and manipulating milk products which comprises heating a liquid milk product containing milk fat in dispersed phase to a temperature sufficiently high to render the milk fat fluid while maintaining the integrity of the fat particles and the original emulsion holding the same in the dispersed phase, subjecting said milk product to a centrifugal separating force for removing a sufficient quantity of the liquid vehicle to produce a milk product which, when cooled to ordinary temperatures, constitutes a plastic cream, cooling said milk product to produce a plastic cream, and thereafter converting said plastic cream into an ultimately desired milk product containing milk fat in the dispersed phase, said conversion step including the dilution of said plastic cream with liquid.

HERMAN D. WENDT.